US008984878B2

(12) United States Patent
Grosch et al.

(10) Patent No.: US 8,984,878 B2
(45) Date of Patent: Mar. 24, 2015

(54) INTERNAL COMBUSTION ENGINE WITH CHARGE AIR COOLING

(71) Applicant: Ford Global Technologies, LLC, Dearborn, MI (US)

(72) Inventors: Hans-Guenter Grosch, Vettweiss (DE); Andreas Kuske, Limburg (NL); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 13/772,462

(22) Filed: Feb. 21, 2013

(65) Prior Publication Data
US 2013/0213367 A1 Aug. 22, 2013

(30) Foreign Application Priority Data

Feb. 21, 2012 (DE) .......................... 10 2012 202 659

(51) Int. Cl.
F02B 29/04 (2006.01)
F02B 33/44 (2006.01)
(Continued)

(52) U.S. Cl.
CPC ............. *F02B 37/00* (2013.01); *F02B 29/0437* (2013.01); *Y02T 10/146* (2013.01)
USPC ...... 60/599; 123/563; 123/568.11; 123/41.72; 60/605.2

(58) Field of Classification Search
CPC ............ F02M 25/0731; F02B 29/0437; F02B 29/0462; F02B 29/075
USPC ................ 60/605.2; 123/563, 568.11–568.13
See application file for complete search history.

(56) References Cited

U.S. PATENT DOCUMENTS 2,346,463 A * 4/1944 Szekely ........................ 123/563
3,444,845 A * 5/1969 Scheiterlein ........... 123/41.82 R
(Continued)

FOREIGN PATENT DOCUMENTS

DE 102007033410 A1 * 1/2009
DE 102008029455 A1 12/2009
(Continued)

OTHER PUBLICATIONS

German Patent and Trademark Office, Search Report for corresponding German Patent Application No. 10 2012 202 659.2 mailed Dec. 14, 2012.

*Primary Examiner* — Thomas Denion
*Assistant Examiner* — Jessica Kebea
(74) *Attorney, Agent, or Firm* — Greg P. Brown; Brooks Kushman P.C.

(57) ABSTRACT

An internal combustion engine has a cylinder head having at least one cylinder. A cover is connected to the cylinder head and covers the cylinder and related valve train components. An exhaust gas turbocharger powered by the engine's exhaust system delivers compressed gasses to the intake system. An exhaust gas recirculation system branches off from the exhaust system downstream of the turbocharger and feeds into the intake system upstream of the turbocharger. A coolant-fed charge air cooler is disposed between the cylinder head and the cover, and at a point that is a geodetically highest point in the intake system when the internal combustion engine is in an installed position. This configuration prevents any liquid that has condensed out of the charge air during cooling from collecting in the cooler and/or in the intake system between the cooler and the at least one cylinder.

12 Claims, 5 Drawing Sheets

(51) Int. Cl.
 *F02B 33/00* (2006.01)
 *F02B 47/08* (2006.01)
 *F02M 25/07* (2006.01)
 *F02B 37/00* (2006.01)
 *F02F 1/10* (2006.01)

(56) References Cited

U.S. PATENT DOCUMENTS

| | | | | |
|---|---|---|---|---|
| 3,881,455 | A * | 5/1975 | Belsanti | 123/563 |
| 4,191,148 | A * | 3/1980 | Patel et al. | 123/563 |
| 4,269,158 | A * | 5/1981 | Berti | 123/563 |
| 5,511,520 | A * | 4/1996 | Regueiro | 123/193.5 |
| 5,544,486 | A * | 8/1996 | Lu | 60/599 |
| 5,931,131 | A * | 8/1999 | Hackett | 123/90.38 |
| 6,029,637 | A * | 2/2000 | Prior | 123/559.1 |
| 6,116,026 | A | 9/2000 | Freese | |
| 6,213,074 | B1 * | 4/2001 | Freese | 123/90.38 |
| 6,640,543 | B1 * | 11/2003 | Seal | 60/609 |
| 7,137,384 | B1 * | 11/2006 | Kavadeles | 123/559.1 |
| 7,469,690 | B1 * | 12/2008 | Kavadeles | 123/559.1 |
| 8,056,545 | B2 * | 11/2011 | Feist et al. | 123/568.12 |
| 2004/0173343 | A1 * | 9/2004 | Starr | 165/168 |
| 2004/0206339 | A1 * | 10/2004 | Suwazono | 123/563 |
| 2006/0005791 | A1 * | 1/2006 | Obidi | 123/41.29 |
| 2011/0277709 | A1 * | 11/2011 | Liimatta | 123/54.4 |
| 2012/0167860 | A1 * | 7/2012 | Wong et al. | 123/542 |
| 2012/0279215 | A1 * | 11/2012 | Roth et al. | 60/599 |

FOREIGN PATENT DOCUMENTS

| | | | |
|---|---|---|---|
| DE | 102004049027 | * | 5/2010 |
| DE | 102009060229 A1 | | 6/2011 |
| FR | 2840363 A1 | * | 12/2003 |
| WO | WO 2007031637 A1 | * | 3/2007 |
| WO | WO 2011091129 A2 | * | 7/2011 |

* cited by examiner

INTERNAL COMBUSTION ENGINE WITH CHARGE AIR COOLING

CROSS-REFERENCE TO RELATED APPLICATIONS

This application claims foreign priority benefits under 35 U.S.C. §119(a)-(d) to DE 10 2012 202 659.2, filed Feb. 21, 2012, which is hereby incorporated by reference in its entirety.

TECHNICAL FIELD

The invention relates to an internal combustion engine having at least one cylinder head, which has at least one cylinder and accommodates at least parts of a valve train, a cover, which can be connected to the at least one cylinder head and covers the parts of the valve train which are accommodated by the cylinder head, at least one intake line, which belongs to an intake system and serves to supply the at least one cylinder with charge air, each cylinder having at least one intake port for feeding in the charge air, an exhaust gas discharge system for discharging the exhaust gases, and a coolant-fed charge air cooler, which is arranged in the intake system and comprises heat-exchange elements through which coolant can flow.

In the context of the present invention, the term "internal combustion engine" includes not only diesel engines and spark ignition engines but also hybrid internal combustion engines, i.e. internal combustion engines which are operated using a hybrid combustion process.

BACKGROUND

Internal combustion engines have a cylinder block and at least one cylinder head, which are connected to one another to form the at least one cylinder. To accommodate the pistons and the cylinder liners, the cylinder block has cylinder bores. The pistons are guided in an axially movable manner in the cylinder liners and, together with the cylinder liners and the at least one cylinder head, form the combustion chambers of the internal combustion engine.

Modern internal combustion engines are operated almost exclusively by means of a four stroke operating method. The charge cycle includes the expulsion of the combustion gases via the at least one exhaust port of the at least one cylinder in order to discharge the exhaust gases via the exhaust gas discharge system and filling with fresh mixture or charge air via the intake system by way of the at least one intake port. In order to control the charge cycle, an internal combustion engine requires control elements and actuating devices for actuating said control elements. To control the charge cycle, the control elements used in four stroke engines are almost exclusively reciprocating valves, which perform an oscillating stroke motion during the operation of the internal combustion engine and, in this way, open and close the intake and exhaust ports. The valve actuating mechanism required for the movement of the valves, including the valves themselves, is referred to as a valve train.

The at least one cylinder head is generally used to accommodate at least some portion of this valve train, which are covered by means of a cover, with the cover being connected (preferably removably) to the cylinder head and surrounding the parts of the valve train in the manner of a housing.

For actuation of a valve, use is made, on the one hand, of valve spring means in order to preload the valve in the direction of the valve closing position, i.e. to subject it to a preloading force, and, on the other hand, of valve actuating devices in order to open the valve counter to the preloading force of the valve spring means. A valve actuating device comprises a camshaft, on which a multiplicity of cams is arranged and to which rotation about the longitudinal axis thereof is imparted in such a way by the crankshaft—by means of a chain drive, for example—that the camshaft and, together with the latter, the cams revolves or revolve at half the speed of the crankshaft.

A fundamental distinction is drawn between a low-mounted camshaft and an overhead camshaft. In this context, the reference point is the parting plane between the cylinder head and the cylinder block. If the camshaft is above this parting plane, it is an overhead camshaft and otherwise a low-mounted camshaft. Overhead camshafts are generally accommodated by the cylinder head, i.e. on the opposite side of the cylinder head from the parting plane.

It is the object of the valve train to open and close the intake and exhaust ports of the cylinders at the right times, the aim being rapid opening of as large as possible flow cross sections in order to minimize throttling losses in the inflowing and outflowing gas flows and to ensure optimum filling of the combustion chambers with fresh mixture and effective, i.e. complete, removal of the exhaust gases.

The intake lines, which lead to the intake ports, and the exhaust lines, which are connected to the exhaust ports, are at least partially integrated into the cylinder head. The exhaust lines of the cylinders are brought together to form a common overall exhaust line or brought together in groups to form a plurality of overall exhaust lines, thereby forming an exhaust gas discharge system. In general, the intake lines of the intake system are fed, i.e. supplied with fresh mixture or charge air, from a common overall intake line.

Internal combustion engines are being fitted more and more frequently with a pressure charging system, pressure charging being primarily a method for boosting power, in which the charge air required for the combustion process in the engine is compressed, thus enabling a larger mass of charge air to be fed to each cylinder in each working cycle. It is thereby possible to increase the fuel mass and hence the mean pressure.

In general, an exhaust gas turbocharger is used for pressure charging, in which a compressor and a turbine are arranged on the same shaft, the hot exhaust gas flow being fed to the turbine, expanding in said turbine and releasing energy in the process, and thereby imparting rotation to the shaft. The energy released by the exhaust gas flow to the shaft is used to drive the compressor, which is likewise arranged on the shaft. The compressor conveys and compresses the charge air fed to it, and pressure charging of the cylinders is thereby achieved.

As in the case of the internal combustion engine according to the invention, a charge air cooler is preferably provided in the intake system, by means of which cooler the compressed charge air is cooled before entry to the at least one cylinder. The cooler lowers the temperature and thus increases the density of the charge air, and the cooler therefore also contributes to better filling of the at least one cylinder, i.e. to a larger air mass. Cooling results in increased density.

A coolant-fed charge air cooler is preferably used, comprising heat-exchange elements through which coolant flows, between which the charge air flows and is cooled.

In order to comply with future limits for pollutant emissions, and especially to reduce nitrogen oxide emissions, exhaust gas recirculation (EGR) is often employed, in which combustion gases are taken from the exhaust gas discharge system on the exhaust side and fed back into the intake system on the intake side.

With an increasing exhaust gas recirculation rate, nitrogen oxide emissions can be significantly reduced. The exhaust gas recirculation rate $x_{EGR}$ is determined by $x_{EGR}=m_{EGR}/(m_{EGR}+m_{fresh\ air})$, where $m_{EGR}$ denotes the mass of exhaust gas fed back and $m_{fresh\ air}$ denotes the fresh air fed in. In order to achieve a significant reduction in nitrogen oxide emissions, high exhaust gas recirculation rates are required, and these can be of the order of $x_{EGR}\approx 60\%$ to 70%.

During the operation of an internal combustion engine with turbocharging and simultaneous use of exhaust gas recirculation, a conflict can arise if the recirculated exhaust gas is taken from the exhaust gas discharge system upstream of the turbine by means of high-pressure EGR and is no longer available to drive the turbine.

As the exhaust gas recirculation rate is increased, the exhaust gas flow introduced into the turbine simultaneously decreases. The reduced exhaust gas mass flow through the turbine entails a lower turbine pressure ratio and, as a result, the boost pressure ratio likewise decreases, and this is equivalent to a lower compressor mass flow. Apart from the decrease in boost pressure, additional problems can arise in the operation of the compressor as regards the pulsation limit.

For this reason, there is a need for concepts which ensure sufficiently high boost pressures with simultaneously high exhaust gas recirculation rates—especially in the part load range. What is termed "low-pressure EGR" offers one approach to a solution.

In contrast to the high-pressure EGR system already mentioned, which takes exhaust gas from the exhaust gas discharge system upstream of the turbine and introduces it into the intake system downstream of the compressor, the procedure in the case of low-pressure EGR is to feed exhaust gas back to the intake side after it has already flowed through the turbine. For this purpose, the low-pressure EGR system comprises a recirculation line, which branches off from the exhaust gas discharge system downstream of the turbine and opens into the intake system upstream of the compressor.

The exhaust gas fed back to the intake side by means of low-pressure EGR is mixed with fresh air upstream of the compressor. The mixture of fresh air and recirculated exhaust gas produced in this way forms the charge air which is fed to the compressor and compressed, with the compressed charge air being cooled downstream of the compressor in the charge air cooler.

The fact that the exhaust gas is passed through the compressor as part of low-pressure EGR does not have a negative effect since use is generally made of exhaust gas which has been subjected to exhaust gas aftertreatment, more particularly in the particle filter, downstream of the turbine. There is therefore no need to fear deposits in the compressor that change the geometry of the compressor, in particular the flow cross sections, and in this way impair the efficiency of the compressor. For the same reasons, moreover, the untreated exhaust gas recirculated by means of high-pressure EGR is not passed through the charge air cooler since this would lead to contamination and deposits in the cooler.

On the other hand, problems can arise downstream of the compressor owing to the cooling of the compressed charge air. According to the prior art, the charge air cooler is often arranged to the side of and adjacent to the internal combustion engine, e.g. at the level of the crank case, i.e. at the level of the cylinder block or the oil sump. This is also done with a view to dense packaging of the overall drive unit.

During cooling, liquids which were previously still present in gaseous form in the charge air, in particular water, can condense out if the dew point of one component of the gaseous charge air flow is undershot. Owing to the arrangement of the charge air cooler and the fact that the precipitated condensate is not removed continuously from the charge air flow and fed to the cylinders in very small quantities due to the kinetics, condensate may collect in the charge air cooler and may then be introduced into the intake system from the charge air cooler unpredictably all of a sudden in relatively large quantities, e.g. in the case of transverse acceleration due to cornering, a hill or a bump. The latter case is also referred to as water hammer, which may lead not only to severe disruption of the operation of the internal combustion engine but also may damage engine components downstream of the cooler.

The problems described above become more severe as the recirculation rate increases since the proportions of the individual exhaust gas components in the charge air, in particular that of water in the exhaust gas, inevitably increase with the increase in the quantity of exhaust gas recirculated. According to the prior art, the quantity of exhaust gas recirculated by means of low-pressure EGR is therefore limited in order to reduce the quantity of water that condenses out or to prevent water from condensing out. The required limitation of low-pressure EGR, on the one hand, and the high exhaust gas recirculation rates required for a significant reduction in nitrogen oxide emissions, on the other hand, lead to differing aims in the dimensioning of the recirculated quantity of exhaust gas.

The indicated conflict in the case of an internal combustion engine pressure charged by means of exhaust gas turbocharging and fitted with a low-pressure EGR system and a charge air cooling system cannot be resolved by the prior art.

According to the prior art, the required high recirculation rates can only be achieved by means of high-pressure EGR, and the disadvantages associated therewith have to be accepted. Consequently, the advantages of low-pressure EGR can only be exploited to a limited extent.

Arranging the compressor on the exhaust side entails a comparatively long travel distance between the compressor and the intake port on the cylinder. However, this travel distance should be kept as short as possible in order to ensure rapid turbocharger response and to minimize the pressure loss in the charge air flow due, in particular, to deflections. Moreover, a long travel distance in the intake system has disadvantages in terms of the noise behavior of the internal combustion engine and leads to low-frequency noise emissions.

SUMMARY

In an embodiment disclosed herein, an internal combustion engine comprises a cylinder head having at least one cylinder and accommodating valve train components associated with the cylinders, a cover connected to the cylinder head and covering the valve train components, an intake system supplying the cylinder with charge air, and a coolant-fed charge air cooler arranged in the intake system. At least a portion of the charge air cooler is located between the cylinder head and the cover.

In an further embodiment disclosed herein, an internal combustion engine comprises a cylinder head having a cylinder and accommodating a valve train component associated with the cylinder, a cover connected to the cylinder head and covering the valve train component, an intake system supplying the cylinder with charge air, an exhaust system conducting exhaust gases away from the cylinder, an exhaust gas turbocharger powered by the exhaust system and delivering compressed gasses to the intake system, and a coolant-fed charge air cooler arranged in the intake system, the cooler disposed between the cylinder head and the cover. The cooler is further disposed at a point that is geodetically higher than an intake port of the cylinder when the internal combustion engine is in an installed position.

In a further embodiment disclosed herein, the point at which the charge air cooler is arranged is a geodetically highest point in the intake system in an installed position of the engine In a further embodiment disclosed herein, an internal combustion engine comprises an exhaust gas recirculation system branching off from the exhaust system downstream of the turbocharger and feeding into the intake system upstream of the turbocharger.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
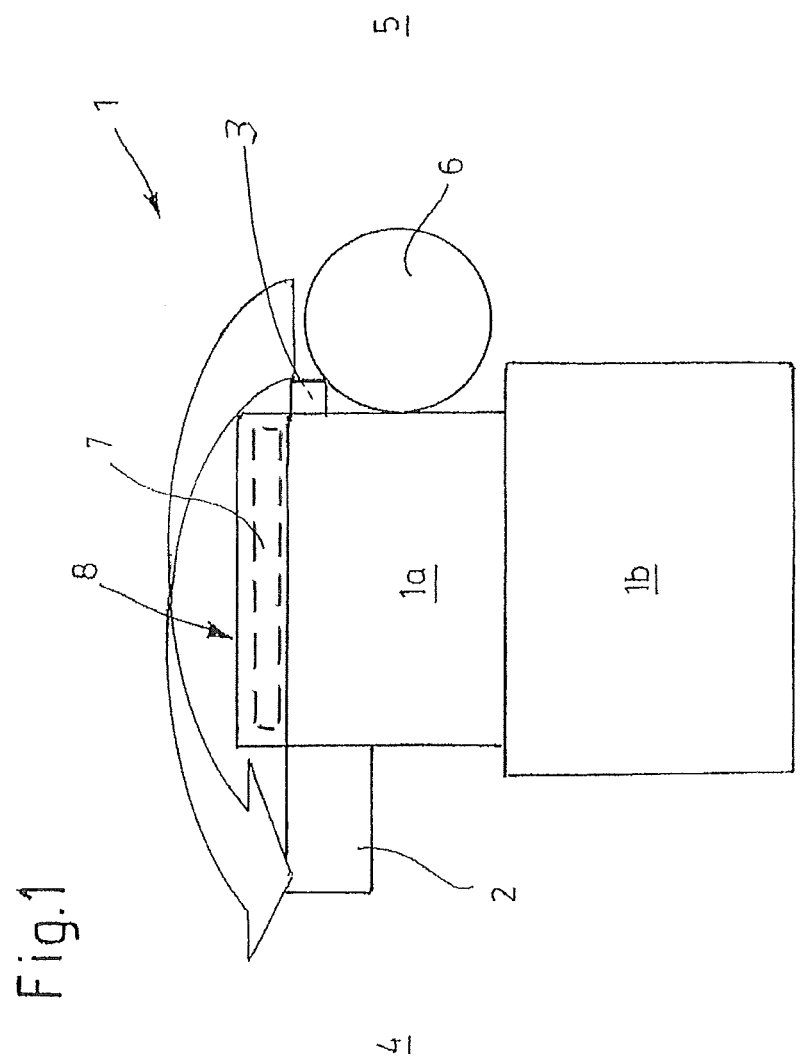
FIG. 1 shows an internal combustion engine schematically in the form of a diagrammatic sketch.

FIG. 1 shows an embodiment of the internal combustion engine 1 schematically in the form of a diagrammatic sketch.

The internal combustion engine 1 has a cylinder block 1b and a cylinder head 1a, which are connected to one another to form the cylinders. An intake system 2 is schematically indicated on an intake side 4 of the engine and an exhaust system 3 is schematically indicated on an exhaust side 5. The engine 1 shown in FIG. 1 is pressure charged by means of an exhaust gas turbocharger 6 driven by the exhaust system 3. The charger 6 is arranged on the exhaust side 5, for which reason the charge air compressed in the compressor of the charger 6 has to be passed from the exhaust side 5 to the intake side 4 (indicated by an arrow).

On the way from the exhaust side 5 to the intake side 4, the charge air compressed in the compressor is cooled in a charge air cooler 7 (indicated in hidden lines) provided in the intake system 2, the cooler 7 being arranged above the cylinder head 1a and being accommodated or housed by a cover 8. In this case, the heat-exchange elements of the charge air cooler 7 are arranged between the cylinder head 1a and the cover 8.

Figure 5:
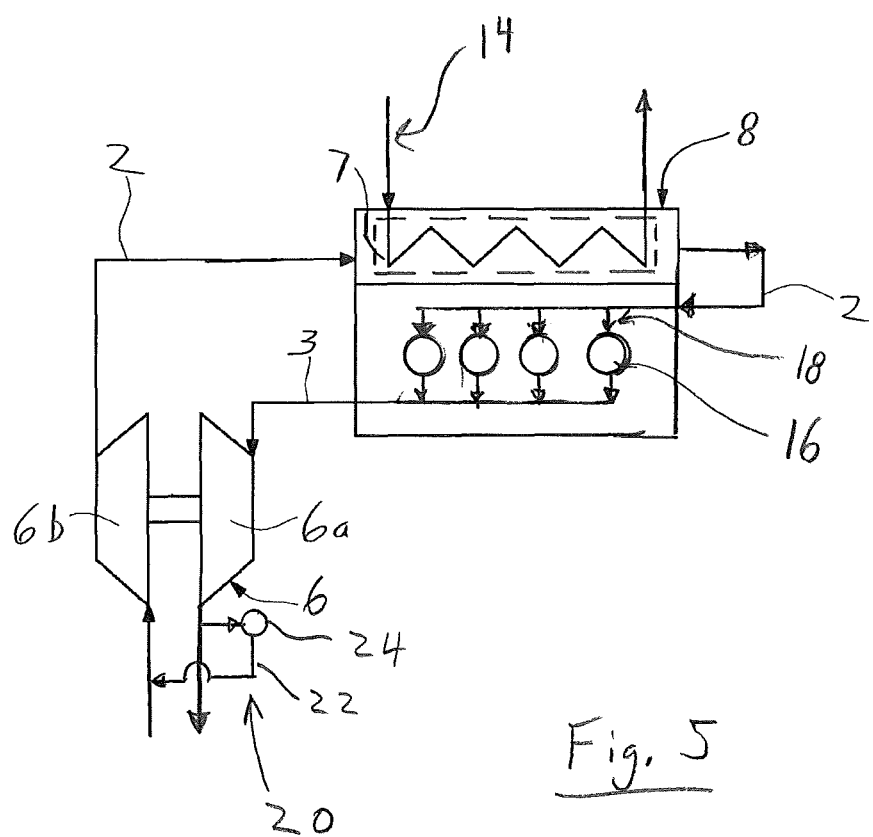
FIG. 5 is a schematic depiction of an internal combustion engine having features disclosed herein.

As shown in an alternative schematic diagram in FIG. 5, turbocharger 6 comprises a turbine 6a rotated by hot exhaust gasses passing through the engine exhaust system 3 and a compressor 6b driven by the turbine. Compressor 6b compresses the charge air which enters the intake system 2. A coolant loop 14 passes through charge air cooler 7 to cool the charge air before it enters the individual engine cylinders 16 through intake ports 18.

A low-pressure exhaust gas recirculation (EGR) system (of the general type well known in the art) is generally indicated at 20 and includes an EGR line 22 which branches off from the exhaust system at a point downstream of turbine 6a and an EGR control valve 24. Control valve 24 is electronically controlled in a manner well known in the art to meter the amount of exhaust gas passing through EGR line 22 and entering the intake system 2 at a point upstream from compressor 6b.

Figure 2:
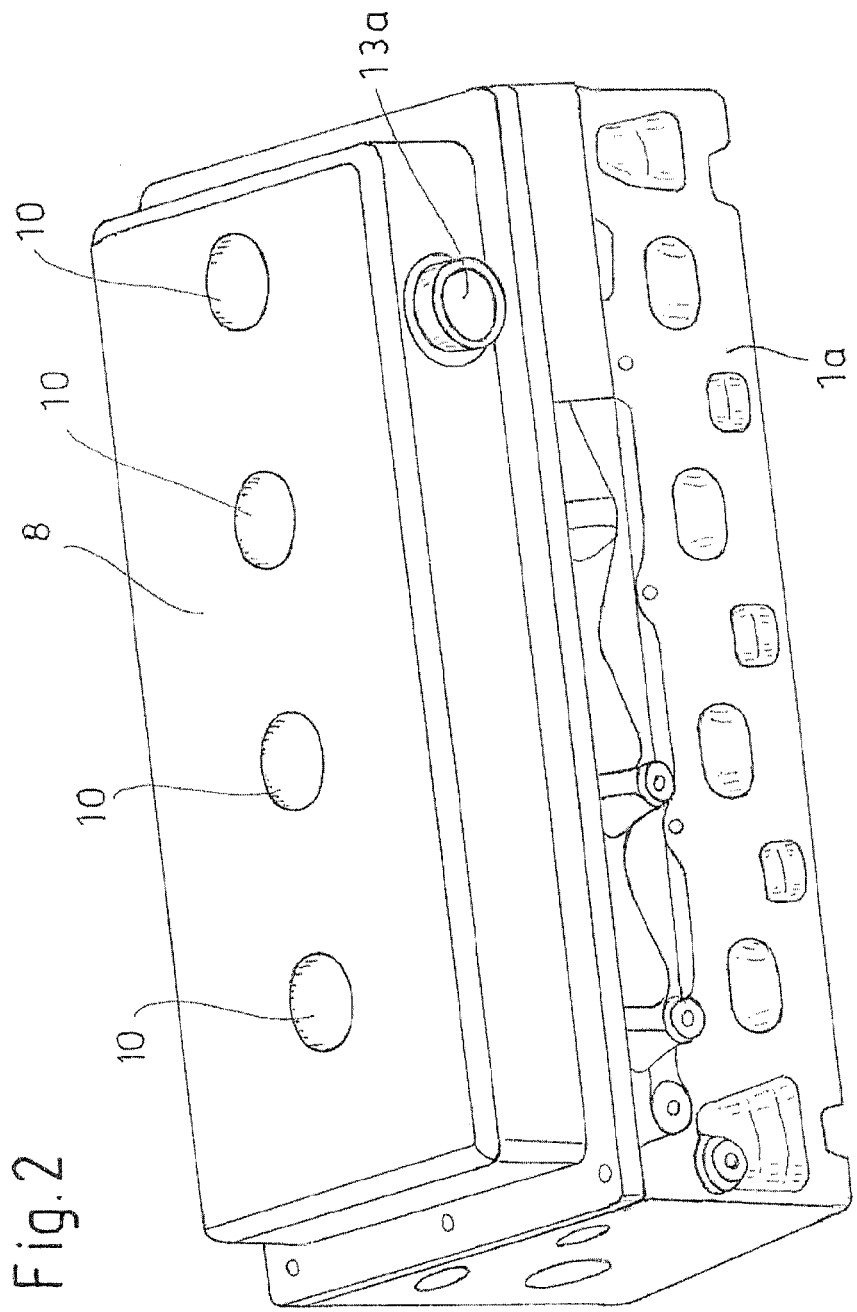
FIG. 2 shows the cylinder head together with the cover of a first embodiment of the internal combustion engine in a schematic perspective view.

FIG. 2 shows the cylinder head 1a together with the cover 8 of a first embodiment of the internal combustion engine 1 in a schematic perspective view. Only those aspects which are additional to what is illustrated in the diagrammatic sketch in FIG. 1 will be explained, and therefore attention is otherwise drawn to FIG. 1. The same reference signs have been used for the same components.

The internal combustion engine 1 illustrated in FIG. 2 is a direct-injection four-cylinder in-line engine. Circular apertures 10 for passing through the injectors (not shown) are provided in the cover 8, the cover 8 itself being of cuboidal design. Moreover, the cover 8 has an opening 13a for the entry of the charge air into the charge air cooler contained within cover 8, as is described in further detail below.

Figure 3:
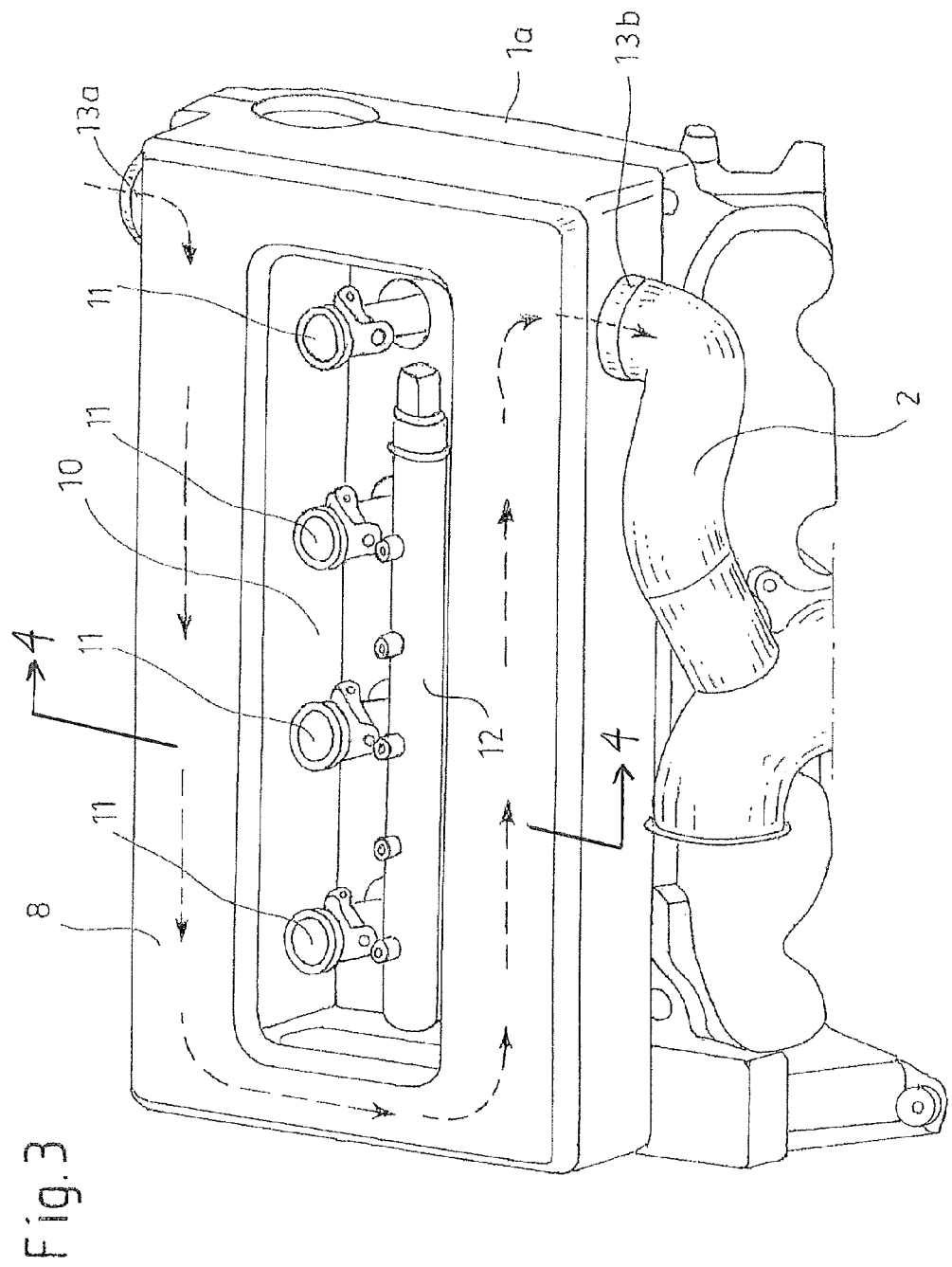
FIG. 3 shows the cylinder head together with the cover of a second embodiment of the internal combustion engine in a schematic perspective view.

FIG. 3 shows the cylinder head 1a together with the cover 8 of a second embodiment of the internal combustion engine 1 in a schematic perspective view. Only the differences with respect to the embodiment illustrated in FIG. 2 will be discussed, and therefore attention is otherwise drawn to FIG. 2. The same reference signs have been used for the same components.

In the internal combustion engine 1 illustrated in FIG. 3, the cover 8 has a single rectangular aperture 10, which leaves sufficient space above the cylinder head 1a for the arrangement of the four injectors 11 and of the fuel line 12 for supplying the injectors 11 with fuel.

An opening 13a for the entry of the charge air (heated by compression in the turbocharger 6) into the charge air cooler and an opening 13b for the exit of the cooled charge air are provided in the cover 8. The charge air flows along a U-shaped cooling section (indicated by dashed-line arrows) through the charge air cooler accommodated by the cover 8.

Figure 4:
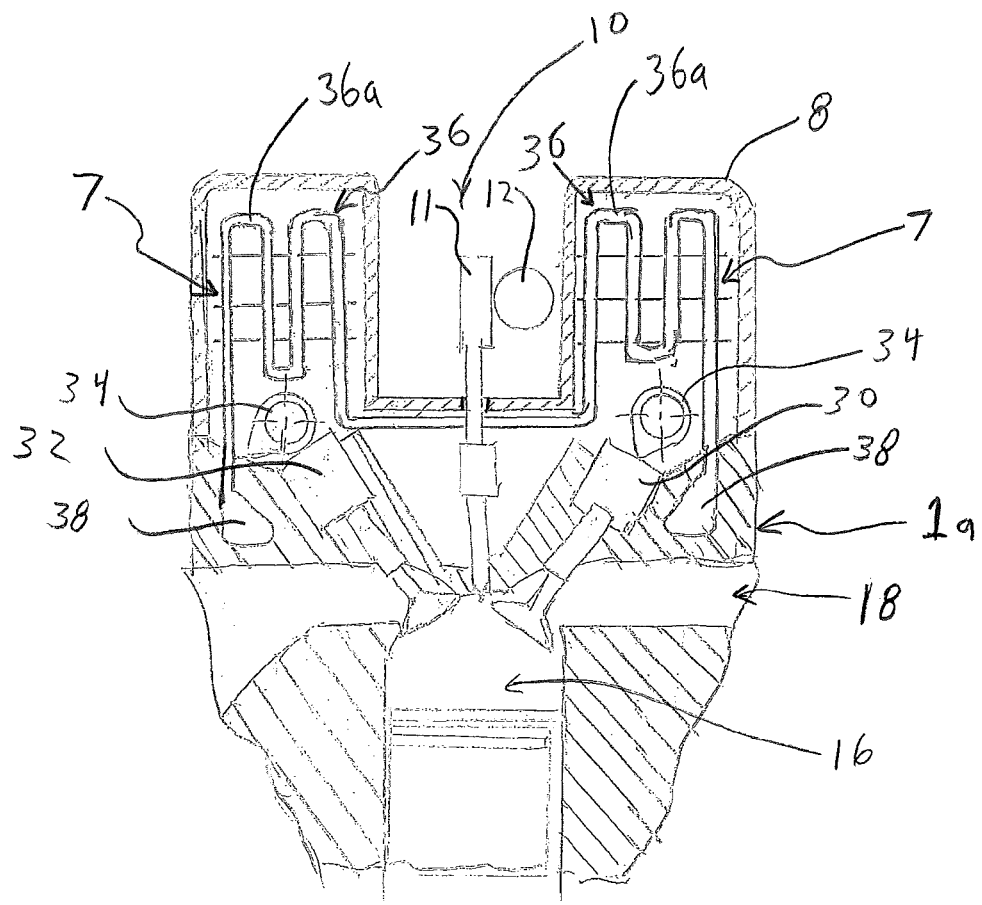
FIG. 4 is a partial cross-sectional view taken along line 4-4 of FIG. 3.

As best seen in FIG. 4, the cover 8 is connected to the cylinder head 1a so as to cover or enclose valve train components, such as intake valves 30, exhaust valves 32, and cam shafts 34. Fuel injector 11 passes through the aperture 10 and injects fuel directly into cylinder 16.

The charge air cooler 7 is enclosed by the cover 8 and comprises a tube-and-fin-type heat exchanger 36 of the general type well known in the art. Tubes 36a of the heat exchanger are connected with coolant passages 38 formed in head 1a so as to form a coolant loop which allows the liquid engine coolant flowing through the engine's coolant jacket to also be utilized by the charge air cooler 7. Coolant passages such as those shown are portions of an integrated cooling jacket of the engine, as is well known in the art.

The charge air cooler 7 is arranged above the at least one cylinder head 1a, i.e. above the at least one intake port 18 of a cylinder, when the engine is in its installed position within a motor vehicle. The cooler is thus arranged at a geodetically higher point than the at least one intake port, when the engine is in the installed position. As a result, any liquid which has condensed out of the charge air during cooling is deprived of the possibility of collecting in the cooler and/or in the intake system between the cooler and the at least one cylinder. Any liquid which has condensed out in the cooler is taken along continuously by the charge air flow, i.e. is entrained due to the kinetics. The transport of the condensate here is based on the movement of the charge air and, in the case of internal combustion engines pressure charged by means of exhaust gas turbocharging, on the boost pressure built up in the intake system by the compressor, and is additionally gravity-driven owing to the placement of the charge air cooler above the intake port.

The small quantities of liquid which may reach and be fed to the cylinders in this case will have little or no detrimental effect on operation of the internal combustion engine. The condensate participates in the combustion process and, owing to the enthalpy of vaporization, even lowers the combustion temperature, thereby exerting an advantageous influence on the formation of nitrogen oxides, namely reducing the latter.

In contrast to the concepts known from the prior art, the internal combustion engine according to the invention does not require any limitation of the quantity of exhaust gas recirculated by means of low-pressure EGR since condensation is not deleterious and therefore does not have to be prevented. This makes it possible to recirculate significantly larger quantities of exhaust gas with a low-pressure EGR system.

To this extent, a low-pressure EGR system can make a much greater contribution to the high exhaust gas recirculation rates required for a reduction in nitrogen oxide emissions in the case of the internal combustion engine according to the invention than is possible according to the prior art.

Moreover, the areas in the engine map in which exhaust gas recirculation takes place exclusively using low-pressure EGR can fundamentally be extended. This is advantageous inasmuch as it is possible to dispense with high-pressure EGR in wide operating ranges of the internal combustion engine, for which reason also the disadvantages associated with the latter are eliminated.

In the internal combustion engine disclosed herein, the charge air cooler is not only arranged above the cylinder head, thereby eliminating the problems relating to the cooling of the charge air and the formation of condensate when using a low-pressure EGR system.

In addition, the charge air cooler disclosed herein is arranged between the at least one cylinder head and the cover of the valve train, and the cover thus acts as a housing and surround for at least some portion of the charge air cooler (and particularly the heat-exchange elements of the charge air cooler), thereby ensuring dense packaging.

At the same time, use is made of the installation space which is available between the cylinder head and the cover, which would otherwise remain unused. This measure ensures that the cooler can be arranged above the cylinder head and that, at the same time, the safety clearance that has to be maintained between the drive unit and the engine hood is maintained without the need to position the drive unit as such at a lower level in the engine compartment. If necessary, the heat-exchange elements of the charge air cooler should be adapted to the conditions under the cover, i.e. constructed in an appropriate manner. Thus, apertures and recesses may be necessary to enable valve train components to be accommodated or avoided.

The charge air cooler is arranged above the at least one cylinder and hence between the exhaust side and the intake side of the internal combustion engine. This contributes not only to dense packaging but also shortens the travel distance between the compressor and the intake port on the cylinder in the case of internal combustion engines pressure charged by means of exhaust gas turbocharging. The short travel distance in the intake system downstream of the compressor ensures a rapid response from the turbocharger and reduces the pressure loss in the charge air flow before entry to the combustion chamber. Unnecessarily long lines are eliminated, further reducing the weight and space requirement of the intake system. A short travel distance also has an advantageous effect on noise behavior.

Parts of the intake system can be formed, i.e. bridged, by the charge air cooler itself, resulting in a large number of advantageous embodiments in respect of the cooler and of the intake manifold.

When using an exhaust gas turbocharger, it is generally advantageous to arrange the turbine as close as possible to the exhaust of the cylinders in order in this way to make the best possible use of the exhaust gas enthalpy of the hot exhaust gases, which is determined by the exhaust gas pressure and the exhaust gas temperature, and to ensure a rapid response from the turbine or turbocharger. For these reasons, the turbocharger and hence also the compressor are positioned on the exhaust side, as close as possible to the exhaust of the internal combustion engine. The effect of this arrangement of the charger is that the charge air compressed in the compressor fundamentally has to be carried to the cylinders from the exhaust side to the intake side, something that required comparatively long lines around the internal combustion engine according to the prior art.

The heat-exchange elements of the charge air cooler may be of plate-type or tubular design.

The internal combustion engine may comprise at least one exhaust gas turbocharger, comprising a turbine arranged in the exhaust gas discharge system and a compressor arranged in the intake system.

The advantage of an exhaust gas turbocharger in comparison, for example, with a mechanical charger (or supercharger) consists in the fact that there is no need for a mechanical connection for power transmission between the charger and the internal combustion engine. While a mechanical charger draws the energy required to drive it directly from the internal combustion engine, thus reducing the available power and hence having a disadvantageous effect on efficiency, the exhaust gas turbocharger uses the exhaust gas energy of the hot exhaust gases.

This notwithstanding, it may be advantageous to provide a mechanical charger as an alternative or in addition to an exhaust gas turbocharger.

Embodiments of the internal combustion engine in which at least two exhaust gas turbochargers are provided are also advantageous. The reasons are as follows.

When a single exhaust gas turbocharger is used, a noticeable torque drop is observed when a certain engine speed is undershot. This effect is unwanted. This torque drop is understandable if it is taken into account that the boost pressure ratio depends on the turbine pressure ratio. If the engine speed is reduced in the case of a diesel engine, for example, this leads to a lower exhaust gas mass flow and hence to a smaller turbine pressure ratio. The result is that, at relatively low engine speeds, the boost pressure ratio likewise decreases, which is equivalent to a torque drop.

In principle, the drop in the boost pressure can be counteracted by making the turbine cross section smaller. However, this requires exhaust gas blowoff at higher engine speeds, and this involves disadvantages for the pressure charging behavior in this engine speed range.

Often, therefore, an attempt is also made to improve the torque characteristic of a pressure charged internal combustion engine by using a plurality of exhaust gas turbochargers, e.g. by means of a plurality of exhaust gas turbochargers arranged in series. Arranging two exhaust gas turbochargers in series, of which one exhaust gas turbocharger serves as a high-pressure stage and one exhaust gas turbocharger serves as a low-pressure stage, it is possible to extend the compressor map in an advantageous manner, namely both toward lower compressor flows and toward higher compressor flows. This is achieved by designing the high-pressure turbine for low exhaust gas mass flows and providing a bypass line, by means of which exhaust gas can increasingly be routed past the high-pressure turbine as the exhaust gas mass flow increases. For this purpose, the bypass line branches off from the exhaust gas line upstream of the high-pressure turbine and opens back into the exhaust gas line downstream of the turbine, with a shutoff element being arranged in the bypass line in order to control the exhaust gas flow routed past the high-pressure turbine.

The torque characteristic of a pressure charged internal combustion engine can furthermore be improved by means of a plurality of turbochargers arranged in parallel with correspondingly small turbine cross sections, which are connected up in succession.

Turbines designed for low exhaust gas flows generally lead to an improved response since they are less sluggish, and the rotor assembly can be accelerated and decelerated more quickly.

Embodiments of the internal combustion engine in which the turbine of the at least one exhaust gas turbocharger is provided with a variable turbine geometry, which allows more extensive adaptation to the respective operating point of the internal combustion engine through adjustment of the turbine geometry or of the effective turbine cross section, may be advantageous. In this case, adjustable guide vanes are arranged in the inlet zone of the turbine to influence the direction of flow. In contrast to the rotor blades of the rotating rotor, the guide vanes do not rotate with the shaft of the turbine.

If the turbine has a fixed, invariable geometry, the guide vanes are not only stationary but are furthermore arranged so as to be completely immovable in the inlet zone, i.e. are rigidly fixed. In the case of variable geometry, in contrast, the guide vanes, although arranged in a stationary manner, are not completely immovable but can be pivoted about the axis thereof, thus making it possible to influence the approach flow to the rotor blades.

This notwithstanding, embodiments of an internal combustion engine in which the turbine of the at least one exhaust gas turbocharger has a fixed turbine geometry may also be advantageous. Compared with a variable geometry, this considerably simplifies the operation of the internal combustion engine and/or of the charger by means of an engine control system. Moreover, there are cost advantages in relation to the exhaust gas turbocharger from the simpler construction of the turbine.

In the case of pressure charged internal combustion engines, embodiments in which the compressor is arranged upstream of the charge air cooler in the intake system may be advantageous. In this way, the air compressed in the compressor is cooled downstream in a second step and is not cooled in the charge air cooler before being compressed by means of the compressor. This embodiment also takes account of the fact that the charge air heats up owing to compression, for which reason cooling that follows compression is preferable.

Embodiments of an internal combustion engine in which an exhaust gas recirculation system is provided, which comprises a recirculation line, which branches off from the exhaust gas discharge system downstream of the turbine and opens into the intake system upstream of the compressor, may also be advantageous.

A low-pressure EGR system in accordance with the preceding embodiment has numerous advantages, especially in conjunction with the charge air cooler arranged in accordance with the invention, these advantages already having been explained in detail and attention being drawn thereto at this point.

It may be advantageous to arrange a shutoff element in the recirculation line, said element acting as a low-pressure EGR valve and serving for adjustment of the recirculation rate, i.e. the quantity of exhaust gas recirculated by low-pressure EGR.

Embodiments of an internal combustion engine in which an additional cooler is provided in the recirculation line of the low-pressure EGR system may be advantageous. This cooler lowers the temperature in the hot exhaust gas flow before the exhaust gas is mixed with fresh air upstream of the compressor, and thus increases the density of the exhaust gases. The temperature of the fresh charge in the cylinder is thereby lowered further, for which reason this cooler also contributes to better filling.

A bypass line which bypasses the additional cooler and by means of which the exhaust gas recirculated by means of the low-pressure EGR system can be introduced into the intake system while bypassing the cooler should preferably be provided.

In the case of an internal combustion engines pressure charged by means of exhaust gas turbocharging, embodiments in which an exhaust gas recirculation system is provided, which comprises a line which branches off from the exhaust gas discharge system upstream of the turbine and opens into the intake system downstream of the compressor, may be advantageous.

Embodiments of an internal combustion engine in which the line of the exhaust gas recirculation system opens into the intake system downstream of the charge air cooler may be advantageous. This avoids a situation where the untreated exhaust gas recirculated by means of high-pressure EGR is passed through the charge air cooler and contaminates the latter.

The provision of a high-pressure EGR system may be required or helpful in order to be able to generate the high recirculation rates required to reduce nitrogen oxide emissions, even if the formation of condensate in the intake system no longer leads to any limitation on low-pressure EGR by virtue of the arrangement according to the invention of the charge air cooler. It should be taken into account that the recirculation of exhaust gas from the exhaust gas line into the intake line requires a pressure difference, i.e. a pressure gradient, between the exhaust side and the intake side. To achieve the required high exhaust gas recirculation rates, a high pressure gradient is furthermore required.

Embodiments of an internal combustion engine in which an additional cooler is provided in the line of the high-pressure EGR system may be advantageous. This additional cooler lowers the temperature in the hot exhaust gas flow and thus increases the density of the exhaust gases. The temperature of the fresh charge in the cylinder is thereby lowered further, and the additional cooler thereby also contributes to better filling of the combustion chamber with fresh mixture.

This notwithstanding, the exhaust gas recirculated by means of high-pressure EGR may also be passed through the charge air cooler in individual cases. For this purpose, the recirculation line of the high-pressure EGR system branches off from the exhaust gas discharge system upstream of the turbine and opens into the intake system downstream of the compressor and upstream of the charge air cooler.

Embodiments of an internal combustion engine in which at least one opening for the entry of the charge air is provided in the cover may be advantageous. The charge air must be passed through the cooler and hence enter the cover. In this case, the charge air can enter the cover through a single opening by way of the overall intake line and, further on, can be distributed between the individual cylinders, wherein the cooler can form at least part of the intake manifold. Alternatively, the charge air may enter the cover through a plurality of openings, i.e. the charge air has already been split into a plurality of partial flows before entry to the cover and the cooler.

The at least one opening for the entry of the charge air is preferably provided on the exhaust side of the internal combustion engine if the internal combustion engine is fitted with an exhaust gas turbocharger and the compressor of said charger is arranged on the exhaust side.

Embodiments of an internal combustion engine in which at least one opening for the exit of the charge air is provided in the cover may be advantageous. If an opening for the exit of the charge air is provided, this opening is preferably provided on the intake side, from where the charge air is fed to the cylinder.

An opening in the cover for the exit of the charge air is not necessary in all cases. Thus, after being cooled, the charge air introduced into the cover and the cooler can also be fed directly to the cylinders from above without the cooled charge air having to leave the cover again. This embodiment is very compact and is distinguished by very short intake lines downstream of the cooler.

In particular, these embodiments make it easier to arrange the entry to the charge air cooler at a geodetically higher point than the exit from the charge air cooler, thereby ensuring that the advantages of the arrangement according to the invention of the cooler take full effect and no condensate collects in the cooler, merely because the exit is at a greater geodetic height than the intake.

In general, embodiments of an internal combustion engine in which the entry to the charge air cooler is arranged at a geodetically higher point than the outlet from the charge air cooler, and embodiments in which the geodetic height in the intake system decreases continuously in the direction of flow from the charge air cooler or the inlet to the charge air cooler to the at least one intake opening of the at least one cylinder may be advantageous.

Embodiments of an internal combustion engine in which the at least one cylinder head is fitted with at least one integrated coolant jacket to form a liquid cooling system may be advantageous. Pressure charged internal combustion engines, in particular, are subjected to higher thermal loads than naturally aspirated engines, for which reason higher requirements are imposed on the cooling system.

With a liquid cooling system, significantly larger quantities of heat can be dissipated than is possible with an air cooling system. Liquid cooling requires that the internal combustion engine, i.e. the cylinder head and the cylinder block, be fitted with an integrated coolant jacket, i.e. requires the arrangement of coolant ducts that carry the coolant through the cylinder head and the cylinder block. The heat is released to the coolant within the component itself. In this arrangement, the coolant is delivered by means of a pump arranged in the cooling circuit, ensuring that it circulates in the coolant jacket. In this way, the heat released to the coolant is dissipated from the interior of the head and the block and removed from the coolant again in a heat exchanger.

Embodiments of an internal combustion engine in which the coolant-fed charge air cooler is connected to the at least one coolant jacket of the at least one cylinder head may be advantageous. In this arrangement, the charge air cooler is supplied with coolant via the cylinder head, making it possible to dispense with external supply lines, which also reduces the risk of leakage. Moreover, certain components can be used jointly for the coolant circuit of the charge air cooler and the coolant circuit of the internal combustion engine, e.g. the pump for delivering the coolant and/or the heat exchanger for cooling the coolant, which is often arranged in the frontal area of the vehicle in order to exploit the relative wind.

Embodiments of an internal combustion engine in which the charge air cooler is arranged at the geodetically highest point in the intake system in the installed position of the internal combustion engine may be advantageous. The reasons have already been stated.

Embodiments of an internal combustion engine in which the cover comprises plastic may be advantageous. The cover is not a component subjected to high thermal loads, and therefore the material can be selected with a view to low-cost production and low weight. Plastic as a material satisfies both criteria.

This notwithstanding, the cover can also be manufactured from a composite material or metal.

Embodiments of an internal combustion engine in which a seal is provided between the cover and the at least one cylinder head may be advantageous.

Embodiments of an internal combustion engine in which the heat-exchange elements of the charge air cooler are arranged in a pack-type configuration and spaced apart from one another may be advantageous. This creates a large surface area which is advantageous for heat transfer, at which heat can be removed from the charge air by means of convection and heat conduction.

Embodiments of an internal combustion engine in which a direct injection system is provided, and each cylinder is fitted with an injector for direct injection of the fuel, may be advantageous.

Embodiments of an internal combustion engine in which the cover and/or the heat-exchange elements has/have at least one aperture for passing through the injectors may be advantageous.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. An internal combustion engine comprising:
a cylinder head having a cylinder;
a fuel injector associated with the cylinder;
a cover connected to the cylinder head to cover a valve and having an aperture through which the injector passes;
an intake system supplying the cylinder with charge air; and a coolant-fed charge air cooler arranged in the intake system, at least a portion of the charge air cooler located between the cylinder head and the cover.

2. The engine of claim 1 further comprising;
an exhaust system conducting exhaust gases away from the cylinder; and
an exhaust gas turbocharger driven by the exhaust system.

3. The engine of claim 2 wherein the turbocharger delivers pressurized gasses to the intake system upstream from the charge air cooler.

4. The engine of claim 2 further comprising an exhaust gas recirculation system branching off from the exhaust system downstream of a turbine of the turbocharger and feeding into the intake system upstream of a compressor of the turbocharger.

5. The engine of claim 1 wherein the cover has at least one opening therein for entry of the charge air.

6. The engine of claim 1 wherein the cover has at least one opening therein for exit of the charge air.

7. The engine of claim 1 wherein the charge air cooler is arranged at a point that is geodetically higher than an intake port of the cylinder when the internal combustion engine is in an installed position.

8. The engine of claim 7 wherein the point at which the charge air cooler is arranged is a geodetically highest point in the intake system in an installed position of the engine.

9. An internal combustion engine comprising:
a cylinder head having a cylinder and accommodating a valve associated with the cylinder;
a fuel injector associated with the cylinder;
a cover connected to the cylinder head to cover the valve and having an aperture through which the injector passes;
an intake system supplying the cylinder with charge air;
an exhaust system conducting exhaust gases away from the cylinder;
an exhaust gas turbocharger powered by the exhaust system and delivering compressed gasses to the intake system; and
a coolant-fed charge air cooler arranged in the intake system, the cooler disposed between the cylinder head and the cover, and at a point that is geodetically higher than an intake port of the cylinder when the internal combustion engine is in an installed position.

10. The engine of claim 9 further comprising an exhaust gas recirculation system branching off from the exhaust system downstream of a turbine of the turbocharger and feeding into the intake system upstream of a compressor of the turbocharger.

11. The engine of claim 9 wherein the point at which the charge air cooler is arranged is a geodetically highest point in the intake system in an installed position of the engine.

12. An internal combustion engine comprising:
a cylinder head having a cylinder and accommodating a valve associated with the cylinder;
a fuel injector associated with the cylinder;
a cover connected to the cylinder head to cover the valve and having an aperture through which the injector passes;
an intake system supplying the cylinder with charge air and having an intake port feeding into the cylinder;
an exhaust system conducting exhaust gases away from the cylinder;
an exhaust gas turbocharger powered by the exhaust system and delivering compressed gasses to the intake system;
an exhaust gas recirculation system branching off from the exhaust system downstream of a turbine of the turbocharger and feeding into the intake system upstream of a compressor of the turbocharger; and
a coolant-fed charge air cooler arranged in the intake system, the cooler disposed between the cylinder head and the cover, and at a point that is a geodetically highest point in the intake system when the internal combustion engine is in an installed position.

* * * * *